Jan. 14, 1947.　　　A. L. JACKSON　　　2,414,152
AUTOMATIC FOOD SLICER AND SLICE COUNTING MACHINE
Filed May 20, 1943　　　6 Sheets-Sheet 1

Inventor
Aldrich L. Jackson,
By Horace Pinkley
Attorney

Jan. 14, 1947.   A. L. JACKSON   2,414,152
AUTOMATIC FOOD SLICER AND SLICE COUNTING MACHINE
Filed May 20, 1943   6 Sheets-Sheet 2

Inventor
Aldrich L. Jackson,

By Thomas Pfiele
Attorney

Jan. 14, 1947.  A. L. JACKSON  2,414,152
AUTOMATIC FOOD SLICER AND SLICE COUNTING MACHINE
Filed May 20, 1943  6 Sheets-Sheet 3

Inventor
Aldrich L. Jackson,
By Thomas L. Fiche
Attorney

Jan. 14, 1947.  A. L. JACKSON  2,414,152
AUTOMATIC FOOD SLICER AND SLICE COUNTING MACHINE
Filed May 20, 1943  6 Sheets-Sheet 4

Inventor
Aldrich L. Jackson
By
Attorney

Jan. 14, 1947.     A. L. JACKSON     2,414,152
AUTOMATIC FOOD SLICER AND SLICE COUNTING MACHINE
Filed May 20, 1943     6 Sheets-Sheet 5
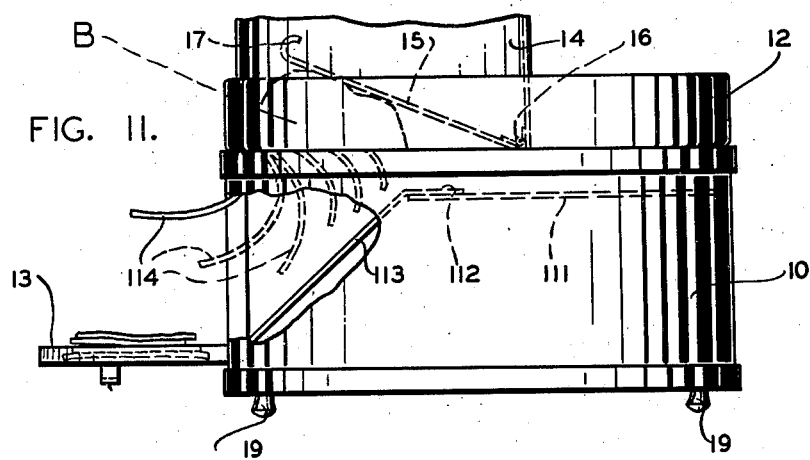
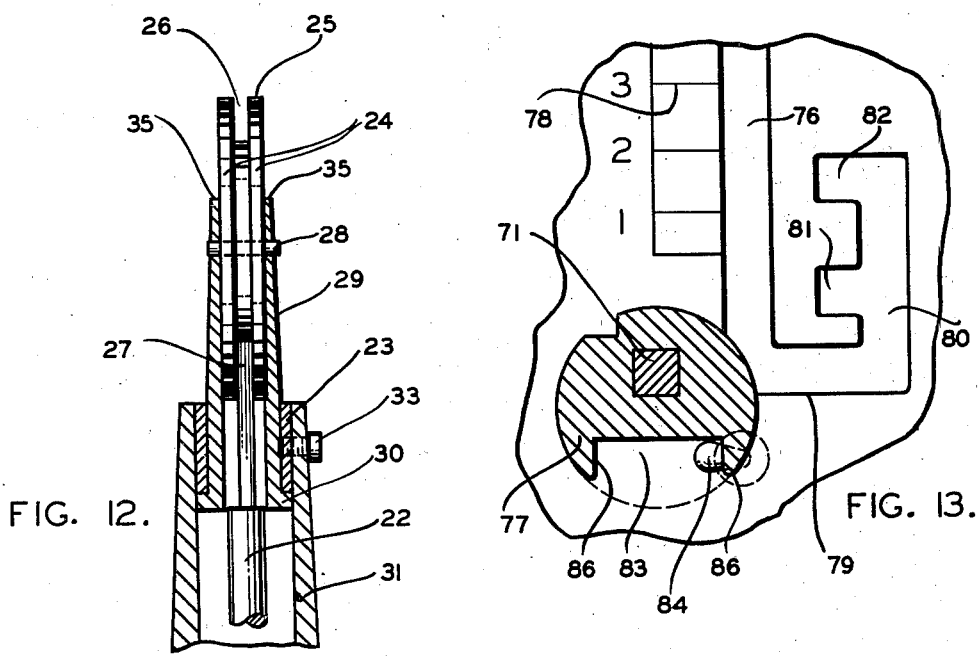
Inventor
Aldrich L. Jackson
By Howard C. Fischer
Attorney Jan. 14, 1947. A. L. JACKSON 2,414,152
AUTOMATIC FOOD SLICER AND SLICE COUNTING MACHINE
Filed May 20, 1943. 6 Sheets-Sheet 6
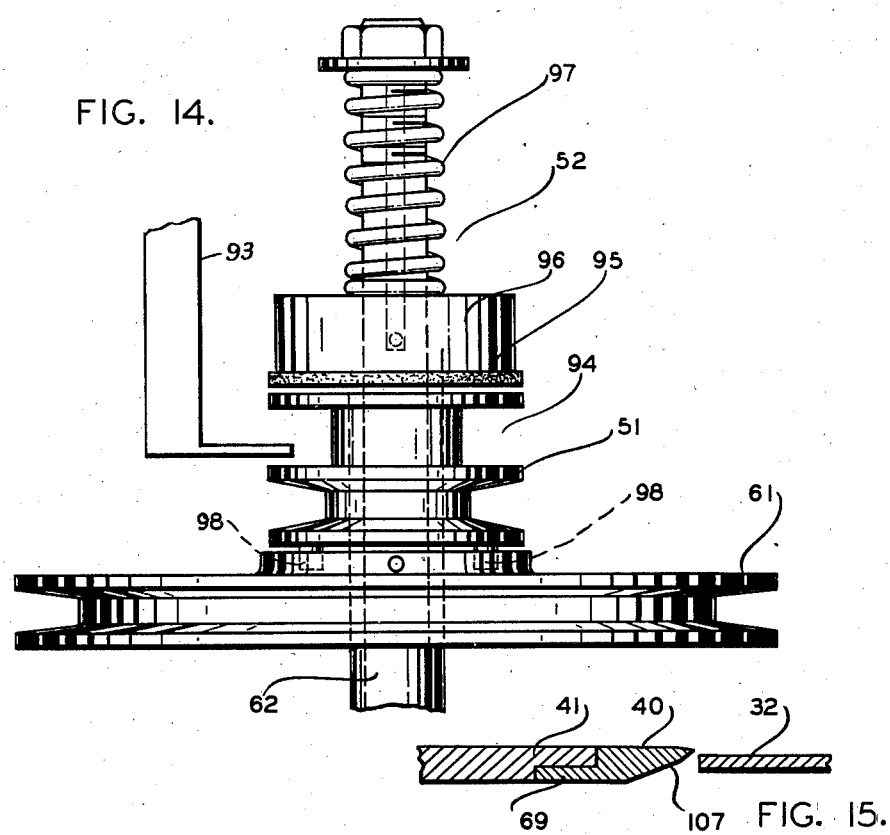
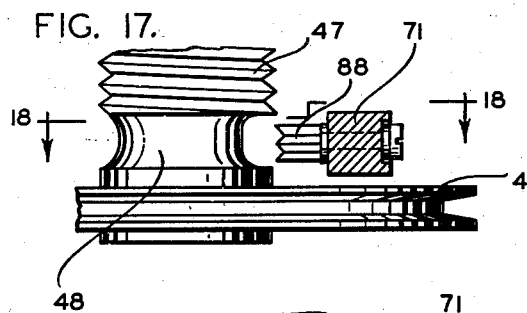
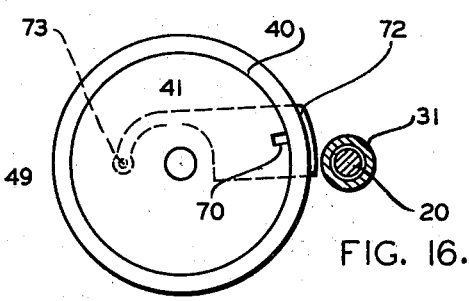
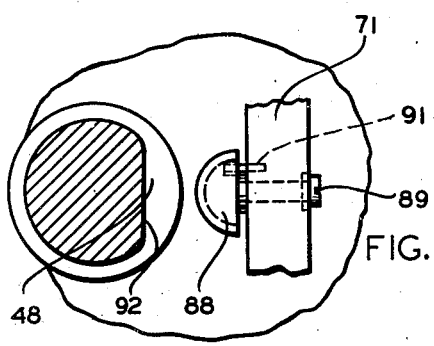
Inventor
Aldrich L. Jackson
By: Thomas Lieber
Attorney Patented Jan. 14, 1947

2,414,152

UNITED STATES PATENT OFFICE 2,414,152

AUTOMATIC FOOD SLICER AND SLICE COUNTING MACHINE

Aldrich L. Jackson, Minneapolis, Minn.

Application May 20, 1943, Serial No. 487,794

8 Claims. (Cl. 146—94)

This invention relates to an electrically operated automatic food slicer and slice counting machine in which is provided means for automatically slicing food such as meat, vegetables, and other food where it is desirable to slice the same.

The machine can be set to count the number of slices to be delivered. Heretofore, conventional type slicers required manual operation of a trough or carrier which held the meat or food to be sliced and operated to carry the same past the slicing knife. This type of machine required a pushing and pulling operation, back and forth, by hand each time a slice was cut and some of these prior types of machines operated the sliding carrier automatically but required a more or less complicated mechanism. In these types of machines the clamping means pierces or bruises the body of the meat being sliced, and such process is relatively slow and does not provide any means of counting or delivering the number of slices desired, and, therefore, requires constant attention of the operator. Furthermore, on prior automatic slicing machines the last portion of the meat or food, underneath the clamp, or holding means, cannot be sliced.

My invention is designed to overcome these undesirable features and I have provided an automatic food slicer and slice counting machine which is formed with a stationary gravity food chute in which the meat or food can be freely placed and wherein it is held while slices are automatically cut from the same.

A further feature of my machine resides in a means for automatically counting and delivering the number of slices desired, together with means for adjusting the same to give the desired thickness of each slice. As the slices of meat are cut and counted automatically by the machine, they are delivered onto a slice receiving tray so that the operator may place a wax tissue or receptacle on the tray and the slices will be delivered automatically onto the same. When the machine is not in operation and the tray is not desired for use, it acts as a closure when moved into closed position for sanitation.

A further feature of my machine resides in means for setting the operating mechanism into a predetermined position to cut each slice the desired thickness and to count the number of slices desired, together with means for automatically stopping the operation of the machine when the number of slices desired have been cut and discharged onto the receiving tray.

Furthermore, I provide an automatic machine which is electrically operated and which is provided with means for sharpening the cutter blade by a simple operation without making it necessary to remove the cutter knife while the same is being sharpened. This sharpening means is a very desirable feature because it permits the operator to easily condition the operating blade so that it is always sharp and thus the desired slices may be cut from the meat or food either in very thin individual slices or in thicker slices, as may be desired.

The operating mechanism is entirely encased within an enclosure providing sanitation and means to protect the operator against any danger in operating the machine. Instead of using a clamp as has been used on some types of automatic machines heretofore, which would pierce or injure the body of the meat or food to be cut, it is only necessary for the operator to place the meat or food that is desired to be cut into a receiving chute and start the machine operating, whereupon it automatically slices and counts the slices and automatically turns off when the desired number of slices have been cut. Thus, the operator, usually a clerk, may continue to serve customers while the slicer operates.

It is also a feature of my automatic food slicer to provide means for operating the slicing knife independent of the work table. Thus the machine may be set to operate with the work table standing stationary while the slicing knife is rotated. This permits the operator to wipe the blade of the slicing knife clean. The cutting blade is in a ring-like form and operates around a friction relieving center plate which does not rotate with the cutting knife but does rotate with the work table. The friction relieving plate is provided on the periphery thereof, outside of the area of the receiving chute, with a clean-out slot so that the portion of the cutting blade which projects under the friction relieving plate may be cleaned at any time.

It is also a feature to provide a ring cutting blade rotatable in the area of the work table, so that when the work table is adjusted in relation to the cutting edge of the ring cutting blade, the thickness of the slices may be varied.

It is also a feature of my slicer to provide a substantially horizontal work table which permits the article being sliced to operate primarily by gravity into cutting position. Thus I provide a rotatable substantially horizontal operating table in which I form an opening for adjusting the ring cutting or slicing blade.

The central area in the ring cutting blade is closed by a disc-like friction relieving plate means, which assists in carrying the gravity of the load during the moment of cutting, while the work table is adjustable up and down to vary the thickness of the slices. The article to be sliced rests upon the surface of the horizontal vertically adjustable work table, and as this table revolves in the operation of the machine, the article comes in contact with the cutting knife, whereupon the friction relieving plate in the center of the cutting knife assists in carrying the load during the moment of cutting.

It is a feature to provide a collector tray beneath the working edge of the ring cutter blade which may be rotated out into a position to be cleaned when desired. In this manner I provide a means of collecting any little particles and grease which may drop away from the cutting edge of the blade into the clean-out tray.

A further feature resides in means for stopping the work table at a predetermined point after the machine has completed the operation of cutting the desired number of slices. This means includes the cutting off of the power which drives the operating table and cutting knife at a predetermined time. This includes a recess cam means formed below the threads of the vertically extending tubular standard which operates the work table. The recess means permits the threaded nut carried by the operating lever to ride into this recess cam, thereby causing the operating lever to automatically swing into position to cut off the electric current which operates the motor of the slicer.

It is also a feature to provide a means of setting the operating lever into several positions. For instance, the operating lever may be set into a position to cause the machine to cut a predetermined number of slices, or the operating lever may be set into a position causing the slicer to continue to operate until the position of the lever is changed, and further, the operating lever may be set in a position where the work table is at rest and only the slicing knife revolves.

It is an important feature in the operation of my slicer that the rotatable horizontal work table stop in a position where the cutting knife is out of the area of the chute which holds the article being sliced. Thus in the operation of my slicer the cutting knife is always brought to rest outside of the area of the cutting chute.

A further feature resides in discharging each slice onto the slice receiving tray which is accomplished by the slicing blade in its horizontal centrifugal rotating movement around the axis of the work table. The swing-like momentum imparted by the blade bevel to the slices as they lengthen and are finally inverted by this force at the cut-off stage, causes them to be carried away from the work table axis by the said momentum onto the receiving tray. The slices are delivered one upon the other in virtually a stacked relation.

In a machine of this character it is of primary importance that the ordinary clerk or inexperienced person may readily operate the machine without danger and in a manner to serve the customer with sliced food as desired. I provide safety features together with means to keep the machine clean and neat at all times. The working parts are enclosed, giving the machine a streamlined appearance. These features, together with other objects and details will be more fully and clearly hereinafter set forth.

In the drawings forming a part of this specification:

Figures 3, 4 and 5 show the sequence in which the cover and the work table are removed.

Figure 11 is a section in elevation showing the manner in which the slices are discharged from the cutting means.

Figure 12 is a sectional detail of the cam for operating the slice gauge work table.

Figure 13 is a detail showing the guiding slot for the operating lever and switch controlling means.

Figure 14 is an enlarged detail of the clutch for controlling the releasing of the driving means for the slice gauging work table.

Figure 15 is a sectional detail of the cutting blade as associated with the slice gauging work table and friction relieving center plate.

Figure 16 is a detail of the tray which is positioned below the cutting knife, for collecting grease and particles from the cutting edge of the cutting knife.

Figure 17 is a detail of the lower end of the threaded tubular shaft which drives the work table and showing the operating lever which carries the threaded nut associated therewith.

Figure 18 is a section on the line 18—18 of Figure 17.

Figure 1:
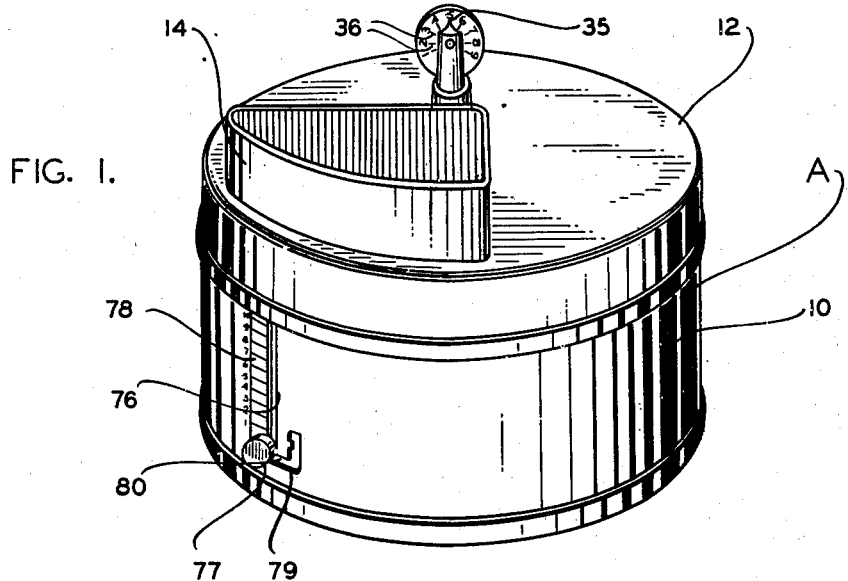
Figure 1 is a perspective view of my electrically-operated automatic slicer and slice counting machine.
Figure 2:
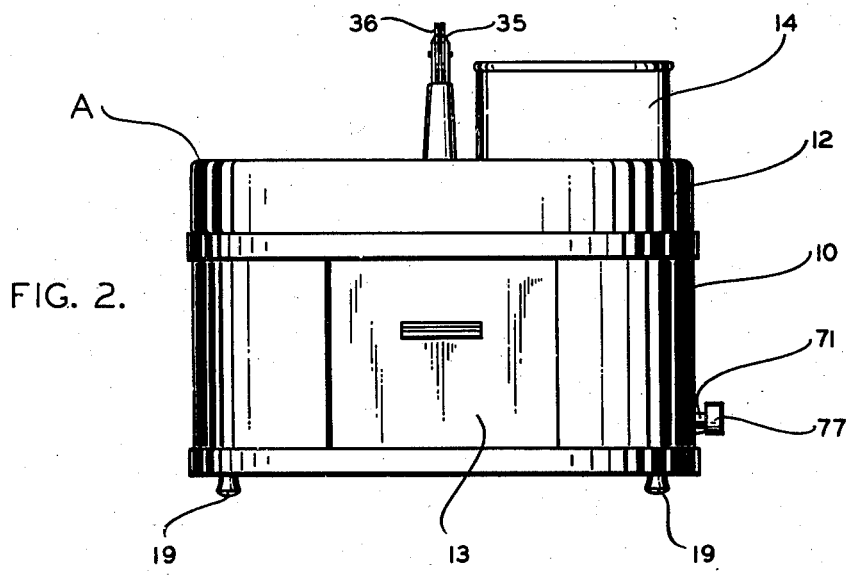
Figure 2 is a side elevation of the same.

The electrically-operated automatic food slicer and slice counting machine A is provided with a lower casing portion 10 which encases the operating parts, including the electric motor 11 and the pulleys which are operated by V-belts as will be hereinafter set forth. The cover of the casing 12 is shown in closed position in Figures 1 and 2. The slice receiving tray 13 is also shown in closed position in Figure 2, and the receiving chute 14 is illustrated projecting above the cover 12. Meat or other food products, such as B, are placed in the chute 14 as illustrated in dotted outline in Figure 11, and the cover 15 which is hinged at 16 is adapted to bear against the meat B to assist in holding the same in place in the chute 14. The cover 15 also closes the bottom of the chute 14 when it is empty so that the cutting knife and work table are not exposed and thus the operator is protected in the operation of the machine. By means of the handle 17 the cover 15 may be elevated so that the meat B or article of food which is desired to be sliced may be placed under the cover in the chute 14.

It is an important feature that all of the working parts of my machine are enclosed and this is accomplished by the streamlined casing of the machine A formed mainly by the lower cylindrical-like base portion 10 which is adapted to be supported by the base spider casting 18 which may be held elevated by the rubber caps 19.

Figure 6:
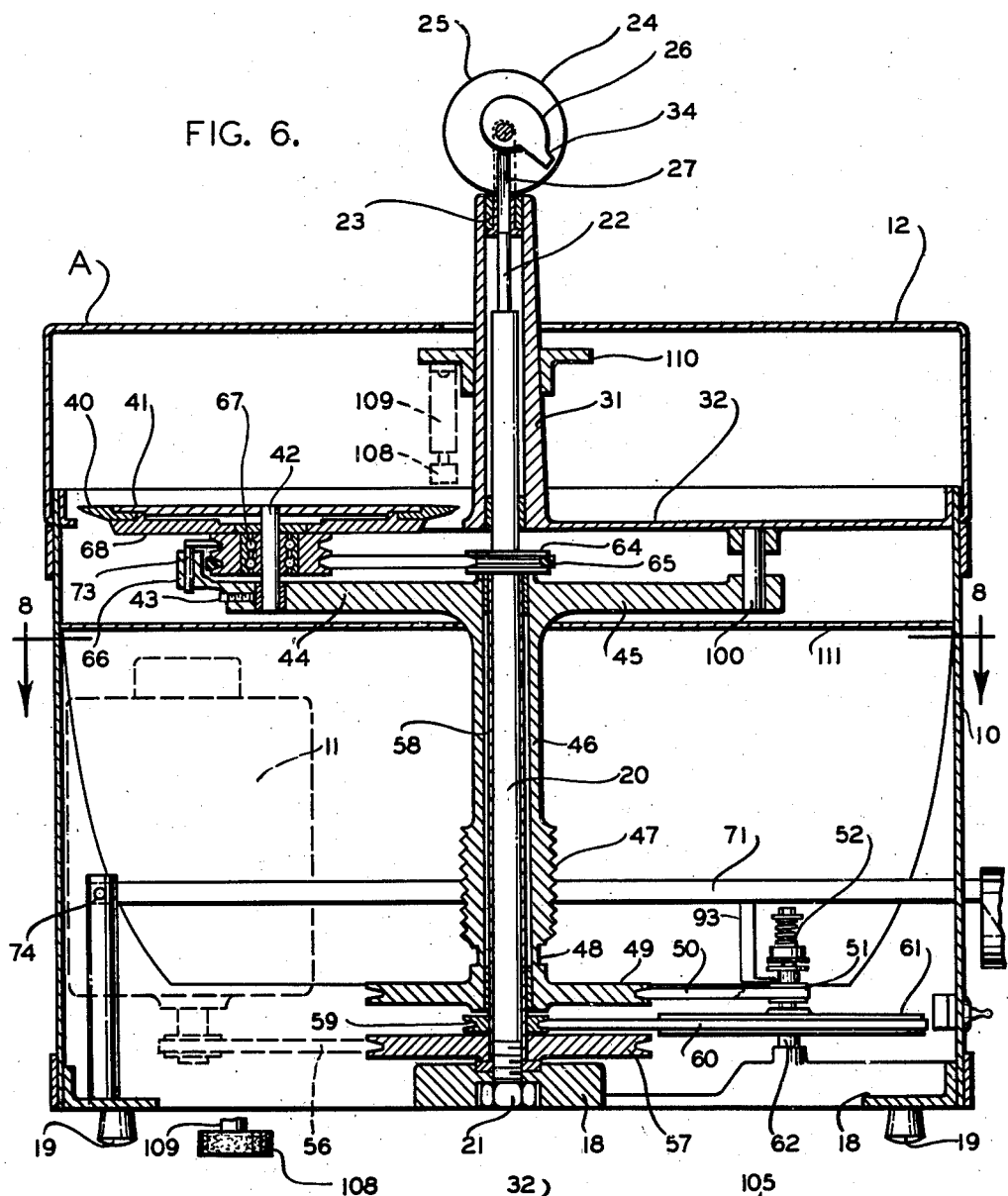
Figure 6 is a vertical cross-section of my slicer.

A central axially positioned supporting shaft 20 is held stationary to the base casting 18 by the nut 21 as illustrated in Figure 6. This axial standard shaft extends from the base up through the cover 12 and is reduced in size at the upper end at 22 to provide for the bushing 23 at the upper end of the shaft 20. The extreme upper end of the shaft 20 is milled flat on two sides so as to extend between the sides 24 of the gauge wheel 25. The gauge wheel 25 is formed with a cam 26 between the sides 24 which rides upon the flattened end 27 of the shaft 20 at the extreme upper end.

The gauge wheel 25 is supported on the axis 28 which is mounted in the bifurcated ends of the collar member 29. This collar member 29 is provided with an annular shoulder 30 which extends around the shaft 22 beneath the bushing 23.

The bushing 23 is supported in the upper end of the tubular extension 31 which is integrally connected with and extends up from the horizontal work table 32. The bushing 23 is fixed to the upper end of the tubular member 31 by the set screw 33. Thus when the gauge wheel 25 is rotated, the cam 26 will bear against the end 27 of the shaft 22 and the sleeve 29 with its collar 30 will adjust to lift or lower the work table 32.

The cam 26 starts from a low point as illustrated in dotted outline in Figure 6, and extends to the high point at the stop shoulder 34. In adjusting the cam 26 by the gauge wheel 25, the work table 32 is raised or lowered in accordance with the position of the cam 26. I provide an indicator point 35 on the sides of the bifurcated end 29 of the collar which cooperates with the gauge lines 36 on the sides of the wheel 25 to indicate the position of the cam 26. In other words, the sides 24 of the wheel 25 are marked with gauge lines to indicate the thickness of the slice to be cut by the machine A so that in the operation of the machine the operator sets the gauge wheel 25 in relation to the pointers 35 to indicate the thickness of the slice to be cut. The setting of the wheel 25 raises or lowers the work table 32 in relation to the ring cutting knife 40.

The ring cutter knife is horizontally positioned and is provided with an anti-friction center table 41 which is secured to the shaft 42. The shaft 42 is held by the set screw 43 in the arm 44 which is diametrically opposite to the arm 45. The arms 44 and 45 are carried by the upper end of the tubular shaft 46. The lower end of the shaft 46 is threaded at 47 and is provided with a cam recess 48 below the threaded portion. Below the cam recess 48 a drive pulley 49 for a V-belt 50 is provided which is operated by the pulley 51. The rotation of the pulley 51 is controlled by the clutch 52 so that the rotation of the shaft 46 and the arms 44 and 45 may be stopped during the operation of the machine when it is desired as will be more fully later set forth.

The electric motor 11 is mounted in adjustable position on the base 18 through the motor base portion 53 so that the adjusting screw 54 may rotate the motor on the shaft 55 which supports the motor to the base casting 18 to adjust the driving belt 56.

The driving belt 56 operates the pulley 57 to rotate the sleeve shaft 58 which extends through the shaft 46. The sleeve shaft 58 supports the small V-driving pulley 59 to operate the belt 60, and in turn operate the larger V-pulley 61. The pulley 61 is mounted on the shaft 62 which extends up from and is mounted in the base 18. The clutch 52 is mounted and operates on the shaft 62.

At the upper end of the tubular shaft 58 I provide a V-pulley 64 which drives the V-belt 65 to rotate the V-pulley 66 mounted on a ball bearing 67 which is carried by the shaft 42. The pulley 66 is connected to the under base portion 68 which supports the ring knife 40 and which is adapted to rotate the ring knife at a high rotating speed. The anti-friction center table 41 stands stationary with the shaft 42 in relation to the rotation of the ring knife 40. The ring knife 40 has a ring under-flange 69 which projects below the annular lower edge of the anti-friction table 41 and which runs in close proximity therewith during the rotation of the knife 40.

I provide a clean-out recess 70 in the peripheral edge of the anti-friction table 41 so that the operator may insert a cloth or cleaning means into the notch 70 while the knife 40 is rotating to clean any grease or residue which may collect on the flange edge 69 of the table 41. This cleaning operation takes place when the horizontal rotatable work table 32 is at rest by the operation of the clutch 52 and the operating lever 71 which will be hereinafter set forth.

Directly below the ring cutting knife 40 I provide a grease collector tray 72 which hingedly supported at 73 to the end of the arm 44 as illustrated in Figures 6 and 16. This clean-out tray 72 is held in operating position beneath the working edge of the knife 40. The clean-out tray may be rotated on the pivot 73 out to a position where the tray may be cleaned out occasionally.

Figure 8:
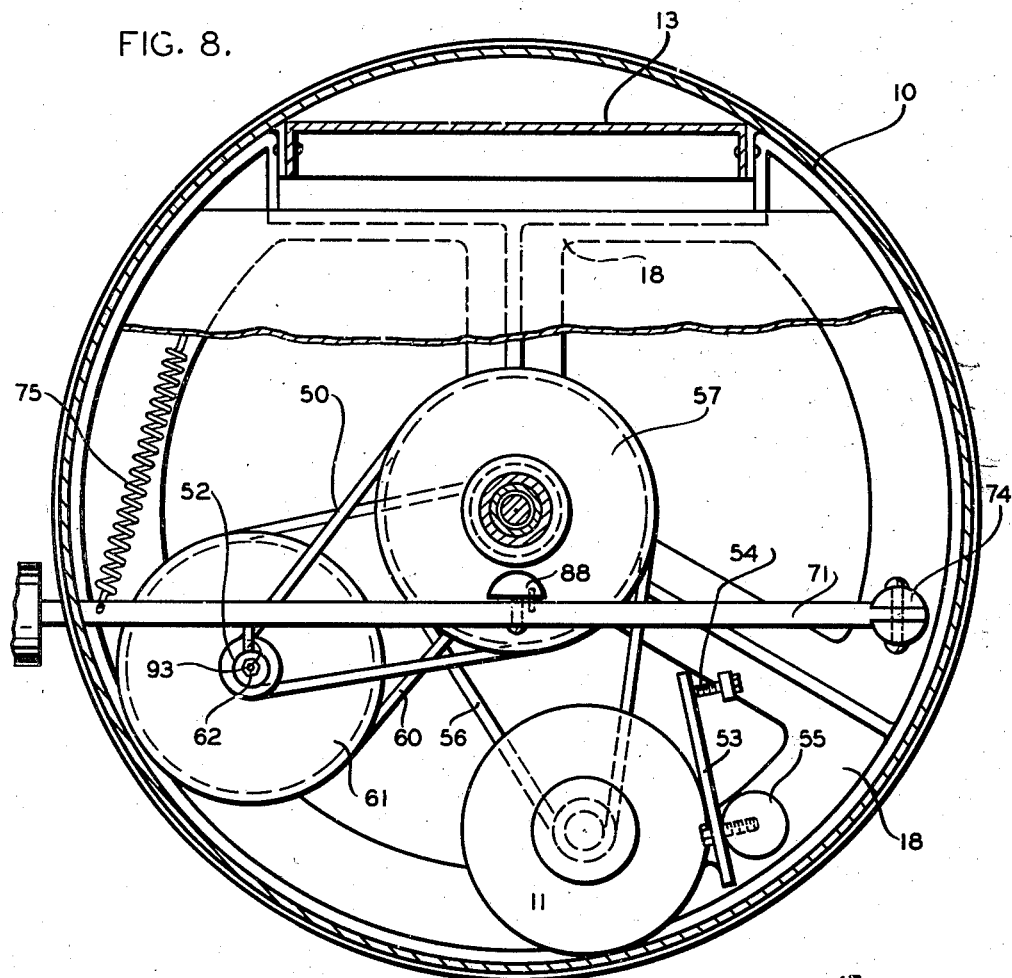
Figure 8 is a section on the line 8—8 of Figure 6.
Figure 9:
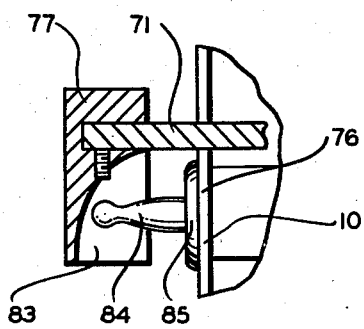
Figure 9 is a sectional detail of the operating switch controlling means.

The operating lever 71 is pivoted on one end at 74, Figures 6 and 8, and the free end of which is adapted to be urged by the coil spring 75 in one direction. The free end of the lever 71 projects out through the slot 76 formed in the casing and is formed with an engaging knob 77 on the outer end. The slot 76 is formed with a vertical portion alongside of which a gauge 78 extends which gauge indicates the number of slices for which the lever 71 is to be set. The lower end of the slot 76 extends horizontally at 79 in either direction below the vertical portion of the slot 76. Looking at the slot 76 in Figures 5 and 13 the horizontal portion 79 extending to the left is in a straight slot while the horizontal portion 79 extending to the right leads into a vertical slot 80. The vertical slot 80 is formed with two notches on the lefthand side, namely 81 and 82.

The operating knob 77 is cut out on the under and inner side to form a notch 83 into which the toggle lever 84 of the electric control switch 85 extends. The electric control switch 85 is for turning the current on and off to the motor 11. The notch 83 is formed with side shoulders 86 which engage against the toggle lever 84. When the motor 11 is turned off the operating lever 71 with the knob 77 is in the position illustrated in Figure 13, while one of the shoulders 86 is shown engaging against the lever 84 of the switch 85 to hold the same in shut off position. When the lever 71 is moved to the right in the horizontal slot 79, as illustrated in Figure 13, the opposite shoulder 86 will engage the lever 84 to turn on the switch 85 to start the motor 11.

The gauge 78 along the left side of the vertical portion of the slot 76 is for the purpose of indicating the number of slices for which the machine may be set which is accomplished by moving the operating knob 77 to the right which moves the free end of the lever 71 along the portion 79 of the slot. Then by moving the lever 71 up into the vertical slot portion 76 to the desired position on the gauge 78 to indicate the number of slices desired, the lever 71 is set in position to automatically stop the machine when the desired number of slices have been delivered onto the receiving tray 13 as shown in Figure 11. The gauge 78 is provided with indicia which indicates the number of slices for which the machine can be set to automatically operate to cut the same, whereupon the machine is stopped automatically.

Figure 10:
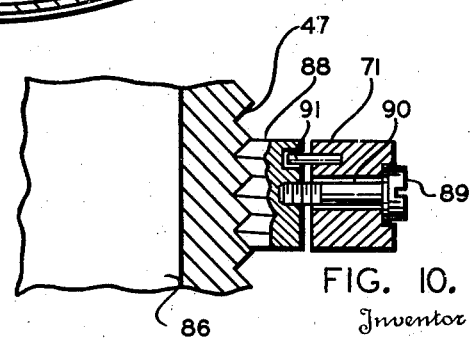
Figure 10 is a sectional detail of the threaded shaft and operating nut on the lever which constitute a portion of the slice counting means.

When the lever 71 is set to a position to indicate the desired number of slices in accordance with the gauge 78, the threaded nut 88, which is in the form of an arcuated segment as illustrated in Figures 8, 10, 17 and 18, is set to engage in the threads 47 of the tubular shaft 46. The nut 88 is mounted by the set screw 89 on the operating lever 71 with a free connection by means of the space 90 formed between the set screw 89 and the lever 71. This free connection permits the threaded nut 88 to adjust itself to the threads 47. A pin 91 limits the movement of the nut 88, said pin 91 being fixed in the lever 71 and projecting into a recess formed in the back of the nut 88, as illustrated in Figure 10.

Thus the operation of my slicer to count the number of slices cut in each said operation is carried out by the nut 88 riding in the threads 47 and when the nut 88 rides out of the threads 47 into the recess 48 and to the cam recess 92, as shown in Figure 18, the lever 71 will be drawn by the spring 75 into the position illustrated in Figure 13 to the far left end of the horizontal portion 79 of the slot 76. As the lever 71 is moved into this position automatically the shoulder 86 will engage the switch lever, turning off the motor 11 and stopping the machine. The machine is set to always stop with the cutting knife 40 outside the area of the chute. When the lever 71 is set for a predetermined number of slices in accordance with the gauge 78, the switch lever 84 is operated by hand to turn on the motor 11 after the lever 71 has been set in position to set the nut 88 in the threads 47 at the desired point in accordance with the gauge 78 so that the machine will selectively slice a predetermined number of slices, depositing the slices automatically onto the receiving tray, as illustrated in Figure 11. The lever 71 is always set in the vertical slot 76 at the point desired to select the predetermined number of slices to be cut by the machine and then the electric motor is operated by operating the switch 85 by hand so that the motor is not operating while the lever 71 is being set to select the desired number of slices.

When the operator desires to run the machine continuously without setting it for a predetermined number of slices, he engages the knob 77 and moves the lever 71 horizontally in the slot portion 79 and then up in the vertical portion 80 to the notch 81. The notch 81 then holds the lever 71 and the machine continues to operate to cut any number of slices desired. As soon as the lever 71 is released from the notch 81 it will drop into the horizontal slot portion 79 and the spring 75 will automatically pull the lever over into the position illustrated in Figure 13, shutting off the switch 85 and stopping the motor 11.

The lever 71 may be set into the notch 82 in which position the motor 11 is adapted to operate to only rotate the knife 40, the means for rotating the horizontal work table 32 being released through the clutch 52 in the following manner: As the lever 71 is raised in the slot 80 to position the same in the notch 82, the arm 93 which projects downwardly from the side of the lever 71 will engage in the annular collar 94 of the clutch mechanism 52 and raise the same into engagement with the brake lining 95 of the collar member 96 against the action of the coil spring 97. As the arm 93 raises the collar 94, clutch pins 98 are released from the pulley 61 and the pulley 51 is raised and the rotation of the same is retarded by the brake surface 95 coming in contact with the surface of the collar 94. Thus the rotation of the pulley 51 and 49, together with the tubular shaft 46 is stopped, see Figures 6 and 13.

The pulley 49 is rigidly secured to the tubular shaft 46 and the arms 44 and 45 being integral with the shaft 46 are brought to rest when the clutch 52 releases the driving pulley 51 from the pulley 61. The work table 32 is connected to the arm 45 by the pin 100 which projects from beneath the work table 32. Thus the pin 100 is engaged by the arm 45 and as the tubular shaft 46 rotates, the work table 32 is rotated therewith when the clutch connects the pulley 51 with the driving pulley 61.

When the work table 32 is at rest by the operation of the releasing clutch 52 and the motor 11 is operating by reason of the lever 71 being positioned in the notch 82, the tubular shaft 58 will rotate the pulley 64 which drives the belt 65 so as to rotate the ring knife 40. The ring knife 40 operates in the opening 101 of the work table 32 and the work table 32 is adjustable as hereinbefore pointed out to raise and lower the same by means of the cam 26, while the ring knife 40 rotates in the same horizontal plane and is carried around with the work table 32.

The ring cutter knife 40 is rotated at a comparatively high rate of speed, while the work table 32 rotates at a lesser speed. Thus when the meat B or other material is placed in the chute 14 in position to be sliced, as illustrated in Figure 11, as the rapidly operating ring knife 40 comes in contact with the edge of the meat B it will literally shave a slice off of the body of the meat B, the thickness of the slice being determined by the position of the horizontal work table 32. The work table 32 and the anti-friction table 41 virtually carry the load of the body of meat B being sliced so that the knife 40 is free to cut a slice virtually without being retarded in its rotation. This permits my slicer to operate with a clean cut for each slice.

Thus the work table 32 rotates in a horizontal plane set in the desired position by the cam 26 and as the work table rotates in this horizontal plane the cutter knife 40 rotates in the opening 101 being carried around the axis of the shaft 20 and in this manner I accomplish a slicing means of a very desirable nature.

It is important that the cutting edge of the knife 40 be kept sharp at all times and to accomplish this I have provided a sharpening wheel 102 which is supported by the arm 103. The arm 103 is pivoted at 104 and by means of the coil spring 105 the cutting wheel 102 is urged in a direction toward the circular knife 40. The arm 103 which carries the cutting wheel 102 is mounted on the under surface of the work table 32. The arm 103 is adapted to be adjusted by the set screw 106 so as to limit the movement of the cutter wheel in one direction. The arm 103 is bent as illustrated in Figure 7, to support the sharpening wheel 102 at an angle in relation to the beveled edge 107 of the cutter knife 40.

Figure 7:
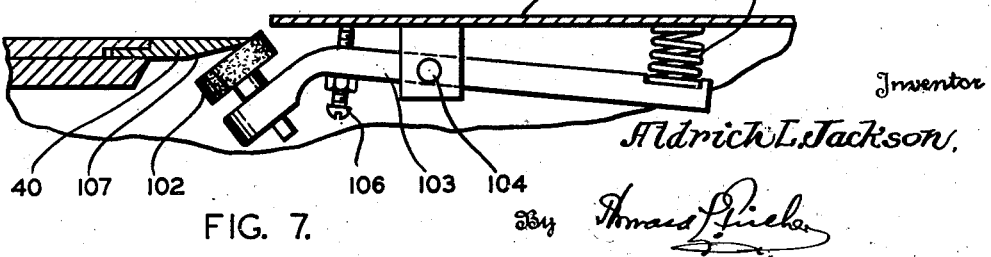
Figure 7 is a detailed sectional view, showing a portion of my machine to illustrate the relative position and operation of the sharpening elements.

When it is desired to sharpen the beveled edge 107 of the cutter knife 40, the knife 40 is operated by the motor 11, as hereinbefore set forth, and the table 32 is adjusted by the cam 26 in a manner to raise the cutting wheel 102 to a position to engage the beveled edge 107 of the ring cutter knife 40, as illustrated in Figure 7. When the under beveled surface of the cutter knife 40 has been thus sharpened the upper surface and cutting edge of the same may be polished off by the polishing and finishing wheel 108 which is pivotally mounted on the lower end of the arm 109 while the arm 109 is mounted on the collar 110, which in turn is secured on the sleeve 31. Therefore, when it is desired to polish off the upper edge of the ring knife 40 by operating the cam 26 through the rotation of the wheel 25, the work table 32 may be lowered until the polishing wheel 108 comes in contact with the upper surface of the cutting blade 40. In this manner I provide a means of sharpening and polishing the cutting edge of the knife 40 by simply operating the cam wheel 25 during the rotation of the cutter blade 40.

Directly below the operating arms 44 and 45 a horizontal wall 111 is positioned in the lower portion 10 of the casing which overlaps the horizontal portion 112 of the inclined wall 113. The inclined wall 113 carries the slices 114 onto the receiving tray if the slices fall before they strike the receiving tray 13. Ordinarily the slices 114 are carried by the momentum of the cutting action of the blade 40 and the rotation of the work table 32 directly onto the receiving tray 13 so that the slices 114 do not fall on the inclined wall 113. The wall 113 provides a means of permitting the slices 114 to slide out to the tray 13 if they should accidentally fall before they are discharged on the tray 13. The wall 111 with the wall 113 protects the operating mechanism including the motor 11 and the pulleys and belts positioned below these walls.

Figure 3:
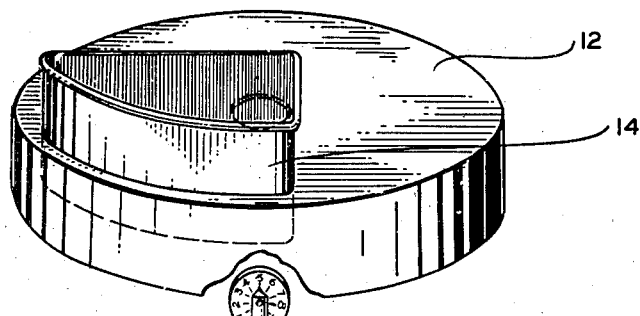
Figure 3 is a perspective view of the cover removed, with the feed chute.
Figure 4:
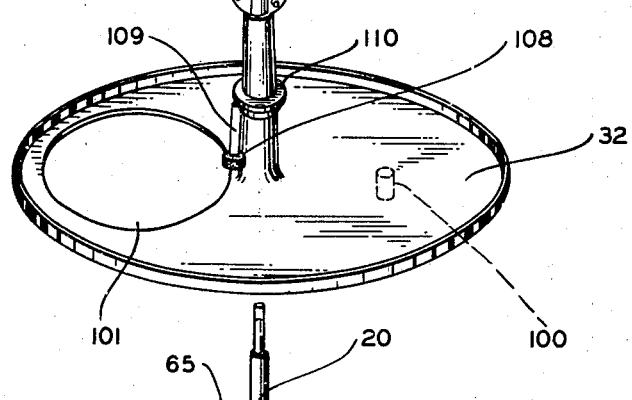
Figure 4 is a perspective of the horizontal work and gauge table removed.
Figure 5:
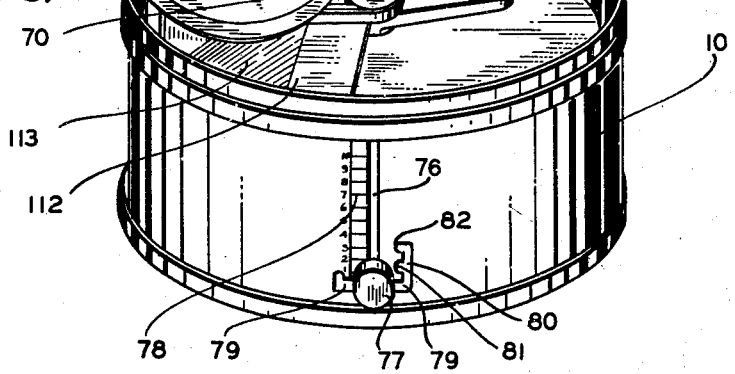
Figure 5 is a perspective looking into the top of the slicer when the top and slice gauging work table are removed, the work table and cover being shown directly in line above the base or lower portion of the slicer.

My electrically operated automatic food slicer and slice counting machine is of a simple nature wherein all of the working parts are protected within the casing. However, the slicer may be taken apart by lifting the cover 12 and the work table 32 from the shaft 20, as illustrated in Figures 3, 4 and 5 and by releasing the pin 104 or by compressing the spring 105 which allows the wheel 102 to slide by the edge of the knife 107. When the cover 12 and the work table 32 are removed, as illustrated, free access is given to the cutter knife 40 and its associated parts. The operating parts below the walls 111 and 113 are accessible through the spider frame of the base casting 18 or the walls 111 and 113 may be removed.

The collar 110 on the tubular extension 31 acts to lift the cover 12 when the work table 32 is raised sufficiently above the knife 40. This is desirable to keep the lower end of the feed chute 14 up out of the path of rotation of work table 32. It is also desirable that the lower end of the feed chute 14 be positioned as close as possible to the cutting edge of the knife 40 when the knife is acting in a slicing capacity. The period during which the collar 110 lifts the cover 12 is during the sharpening operation of the sharpening wheel 102.

I claim:

1. An automatic slicing machine including a rotatable ring slicing knife, an anti-friction plate within said ring knife, means for carrying said knife about an operating axis in a virtually horizontal plane, means for supporting the article to be sliced in the path of horizontal rotation of said slicing knife, means for rotating said slicing knife about the axis thereof while being moved in a horizontal plane past the article being sliced, means for automatically stopping said means for carrying said knife about an operating axis with said rotatable ring slicing knife beyond the cutting area of said means for supporting the article to be sliced whereby momentum will be imparted to the slices causing the same to be discharged in an inverted position outwardly away from the axis of said slicer.

2. A slicer for food and the like including a common axis, a work table rotatable about said axis, a ring slicing knife having its axis located within the area of said work table, means for carrying said slicing knife about said common axis, a single stationary chute for receiving the article to be sliced positioned within the area of said rotatable work table, said slicing knife being moved past said chute and adapted to cut individual slices from the material held in said chute, means for automatically stopping said work table with said slicing knife outside the area of said chute and means for rotating said slicing knife at a greater rate of rotation than the rotation of said work table.

3. A food slicing device, comprising a work table upon which the food may rest by gravity, a ring slicing knife, an anti-friction table within the area of said ring knife, said ring knife being positioned within the area of said work table, a sharpening and honing means for said cutting knife, an electric means for operating said work table about an axis, and for rotating said ring cutter knife at a higher rate of rotation than said work table, means for setting said slicing device to cut a predetermined number of slices, gauge means adapted to indicate the positions of said setting means, a casing for enclosing all of the working parts of said slicer to protect the operator thereof, means for setting said work table in relation to said ring cutter knife to cut slices of a predetermined thickness, said setting means being also adapted to set said sharpening and honing means to permit the operator to set said sharpening and honing means to sharpen said slicing knife without opening the case of the machine.

4. An automatic slicing machine comprising a casing, means therein for supporting material to be sliced, a knife rotating in a horizontal plane and being bodily movable past the material to slice the same, a chute extending from a point adjacent the inner edge of said material supporting means toward the exterior of said casing, and a receiving tray disposed adjacent the outer end of the chute, whereby slices as they are being cut have momentum imparted thereto as they lengthen and are inverted and discharged onto said receiving tray.

5. An automatic slicing machine including a slicing knife, means for carrying said knife about an axis in a horizontal plane, a work table surrounding said knife, said table being supported upon an actuating shaft, means for adjusting said work table to gauge the thickness of slices cut by said slicing knife, means for operating said work table and said slicing knife, means for controlling the operation of said slicer to set the same to cut a predetermined number of slices and to stop the operation of said machine when the slices have been cut, said last named means including a control lever, said lever being settable to engage a thread disposed upon the said table actuating shaft, and riding off of said thread to stop the machine, and a casing for enclosing all of the working parts of said slicer.

6. An automatic slicer including a slicing knife, a work table associated with said slicing knife, means for adjusting the position of said work table in relation to said slicing knife, said work table and said slicing knife being mounted upon coaxial hollow shafts, means to drive the hollow shaft supporting said slicing knife, means driven by said knife supporting shaft for driving said work table supporting shaft, including a clutch interposed between the driving connections between said hollow shafts, whereby the operation of said work table may be stopped while the operation of said slicing knife continues, and means for setting said slicer to cut and deliver a predetermined number of slices and to automatically stop said slicer upon completion of the slicing operation.

7. An automatic slicer including a work table rotatable in a horizontal plane, a slicing knife mounted to rotate with the work table and being rotatable about its own axis, means for adjusting the vertical position of the work table with respect to the slicing knife to adjust the thickness of slice, a slicing knife sharpening means mounted on said work table, said sharpening means being engageable with said slicing knife to sharpen same when the work table is adjustable sufficiently with respect to the slicing knife.

8. A food slicer comprising a slicing knife, a work table having an opening in which said slicing knife is adapted to operate, a central standard shaft, a base for supporting said shaft, coaxial hollow shafts carried by said standard shaft, means for independently driving said coaxial shafts, and connections whereby one of said co-axial shafts is adapted to rotate said work table at a predetermined speed of rotation and the other of said co-axial shafts is adapted to rotate said slicing knife at a greater rate of rotation than said work table, the work table actuating shaft having a thread disposed thereon, and a control lever settable to engage said thread and riding off of said thread to stop the machine.

ALDRICH L. JACKSON.